United States Patent Office 3,551,088
Patented Dec. 29, 1970

3,551,088
ACID RED DYE SOLUTION
Martin Luther Kesler, Charlotte, N.C., and Robert Francis Bann, Bridgewater Township, Somerset County, N.J., assignors to American Cyanamid Company, Stamford, Conn., a corporation of Maine
No Drawing. Filed Mar. 31, 1967, Ser. No. 627,322
Int. Cl. D06p *1/02;* C03c *25/00*
U.S. Cl. 8—41                                                            4 Claims

ABSTRACT OF THE DISCLOSURE

A concentrated solution of a red dye having the formula:

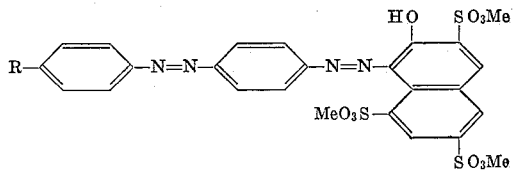

where R is H or $SO_3Me$ and Me is an alkali metal is prepared by adding defined amounts of the dye, water and alkali metal hydroxide to a defined amount of dimethylsulfoxide and stirring until the dye is dissolved. The dye solution is stable and fluid at temperatures down to about $-25°$ C. and is especially suitable for dyeing fiberglass with the aid of a phenol-formaldehyde resin.

---

This invention relates to a red dye solution. More particularly, it relates to a concentrated red dye solution which is stable at low temperature and is suitable for dyeing fiber glass with the aid of a synthetic resin binder.

There is a need for a concentrated red dye solution to be used in dyeing fiber glass in combination with a synthetic resin of the phenolic type. The dye solution must be very concentrated, i.e., of high tinctorial power and it must be compatible with the phenolic resin. Also, for shipping and storage purposes, the dye solution should be stable at temperatures below $0°$ C. Furthermore, the dye itself must be stable at the high temperature used for curing the phenolic resin. Previous dyes and their solutions have been unacceptable for lack of one or more of the foregoing requirements.

It is the object of this invention to provide a dye solution fulfilling all of the said requirements.

The aforesaid object is accomplished by the present invention whereby there is provided a concentrated red dye solution comprising one of two specific acid azo dyes or mixtures thereof, water and dimethyl sulfoxide as co-solvents and an alkali metal hydroxide as an auxiliary aid to solution.

The dyes are acid azo reds of the formula:

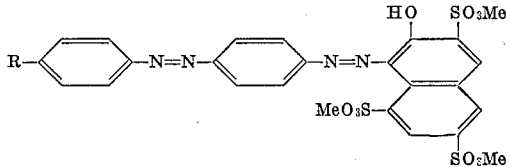

wherein R is hydrogen or $SO_3Me$ and Me is an alkali metal.

While these two dyes were the most soluble of the acid azo red dyes tested and found to possess the required compatibility (with the phenolic resin) and stability (at the temperatures used for curing the resin), still aqueous solutions of the dyes of sufficient strength and stability for commercial use could not be attained heretofore. Thus, even when various alkalis were used to increase their solubility, the maximum concentration attained was only 8–10%; and, on standing the dyes crystallized out of solution.

In accordance with the present invention, however, it has been found that much more highly concentrated solutions, containing up to 26% of the dyes can be prepared. These solutions remain fluid at temperatures as low as about $-25°$ C.; and, even when subjected to lower temperatures they become fluid and usable again when warmed.

The two dyes of the invention are conveniently made by diazotizing either 4-aminoazobenzene or 4-aminoazobenzene-4'-sulfonic acid and then coupling the diazo, under alkaline conditions, with 2-naphthol-3,6,8-trisulfonic acid, as shown in the following examples. The dye product, with or without the further addition of salt, is isolated by filtration. While it is unnecessary to remove all of the inorganic salts (chiefly alkali metal chlorides and sulfates) from the dye product, it is advantageous from the standpoint of attaining maximum stability of the subsequently prepared dye solution to remove as much of the mother liquor as possible during the filtration operation. Also, it is unnecessary to dry the dyes, although this may be done if desired. Suitably, the undried dye product contains about 40 to 45% total solids of which about 75% is real dye, calculated as the sodium salt.

As stated above, the dyes may be used singly or in combination. The combination offers certain advantages of improved solution stability. The dyes are in the form of alkali metal salts, normally the sodium salts.

As previously indicated, the concentrated dye solutions of the invention are obtained by the use of water and dimethyl sulfoxide in combination. Also, for maximum solubility, it is necessary to use an alkali metal hydroxide, such as sodium or potassium hydroxide or a combination thereof. More specifically, for each 100 parts by weight of dye solution, there are used from about 40 to about 55 parts, preferably from 42 to 50 parts, of water; from about 10 to about 25 parts, preferably from 12 to 20 parts, of dimethyl sulfoxide; from about 20 to about 30 parts, preferably from 24 to 28 parts, of dye (real dye as the sodium salt); and from about 2 to about 6 parts, preferably from 2.5 to 5 parts, of alkali metal hydroxide. Also between zero and 15 parts, preferably not over 12 parts, of inorganic salts may be present.

In preparing the solution, it is advantageous to add the dye and alkali metal hydroxide to the dimethyl sulfoxide while stirring the latter at ambient temperature. The dye and alkalis may be added simultaneously or in consecutive small portions of each. If the dye has been dried, the necessary amount of water is introduced with the dimethyl sulfoxide. Stirring is continued until a homogeneous solution is obtained.

In the following examples, the parts and percentages are by weight.

EXAMPLE 1

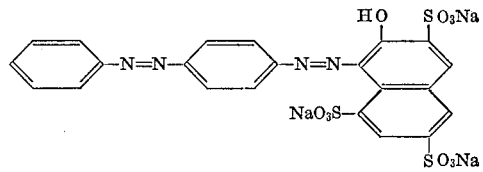

A suspension of 768 parts of 4-aminoazobenzene hydrochloride in about 11,000 parts of water containing 181 parts of hydrochloric acid (100%) is diazotized at 12–16° C. by adding 1,184 parts of 25% aqueous sodium nitrite solution. Sodium chloride (2,000 parts) is added to a solution of 1,800 parts of 2-naphthol-3,6,8-trisulfonic acid in about 1,100 parts of water plus sufficient 24% aqueous caustic soda solution (about 1300 parts) to provide a pH of 2.5–5.0. Ice is then added to a temperature of 0–5° C., followed by the diazo solution also at 0–5° C. A solution of 768 parts of sodium carbonate in about 5,000 parts of water is immediately added, and the dye mixture is then stirred at 25° C. and pH of 8.9–9.1 for 4–5 hours. The dye is precipitated at 25° C. by adding 5 parts of sodium chloride per unit volume equivalent to 100 parts of water. The dye is separated by filtration, removing as much of the mother liquor as possible.

EXAMPLE 2

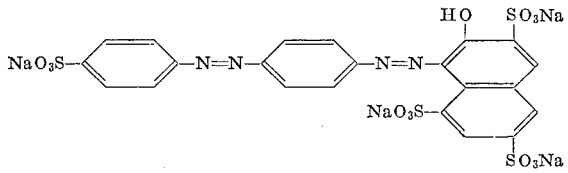

A solution of 27.7 parts (0.1 mole) of 4-aminoazobenzene-4'-sulfonic acid (as the sodium salt) in about 475 parts of water is diazotized at 50–60° C., by adding 34 parts of 31.5% hydrochloric acid and 6.9 parts (0.1 mole) of sodium nitrite as a 25% aqueous solution. To a solution of 45 parts (0.1 mole) of trisodium 2-naphthol-3,4,8-trisulfonate in about 300 parts of water containing sufficient sodium hydroxide to neutralize excess acidity of the naphthol trisulfonate, 30 parts of sodium carbonate and 50 parts of sodium chloride are added. The diazo solution is then added to the naphthol-trisulfonate solution at a temperature of 0–5° C. After the mixture is stirred for 4–6 hours, the dye is separated by filtration and dried.

EXAMPLE 3

A suitable vessel is charged with 1,330 parts of dimethyl sulfoxide. To this is added alternately while stirring 6,350 parts of undried dye filter cake from Example 1, containing 2,660 parts dry, unpurified dye (about 1,990 parts of pure dye as the sodium salt), and 208 parts of sodium hydroxide. Stirring is continued until solution is complete. This solution contains about 26% of real dye as the trisodium salt.

EXAMPLE 4

A suitable vessel is charged with 18 parts of dimethyl sulfoxide, 36 parts of dried dye from Example 2 containing about 26 parts of pure dye as the sodium salt, 3 parts of sodium hydroxide and 43 parts of water. The mixture is stirred until the dye is dissolved. The solution contains about 26% of real dye as the tetrasodium salt.

EXAMPLE 5

A dye solution is prepared according to the procedure of Example 4, except that a 50/50 mixture of the dyes from Examples 1 and 2 is substituted for the dye used therein.

EXAMPLE 6

Fiberglass dyeing

The dye solution of Example 3 is mixed with an aqueous solution of phenol-formaldehyde resin and the mixture sprayed onto a fiberglass batting. The batting is then heated for 3 minutes in an oven maintained at 450° F., in order to cure the resin. The fiberglass is thus dyed the same red shade as dyeings made without the curing step.

We claim:
1. A dye solution comprising per 100 parts by weight of said solution, from about 40 to about 55 parts of water, from about 10 to about 25 parts of dimethyl sulfoxide, from about 2 to about 6 parts of alkali metal hydroxide and from about 20 to about 30 parts of dye having the formula:

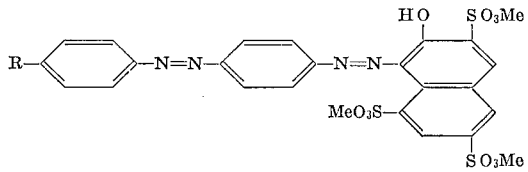

wherein R is hydrogen or SO$_3$Me or Me is alkali metal.

2. A dye solution comprising, per 100 parts by weight of said solution, from 42 to 50 parts of water, from 12 to 20 parts of dimethyl sulfoxide, from 2.5 to 5 parts of alkali metal hydroxide and from 24 to 28 parts of dye having the formula:

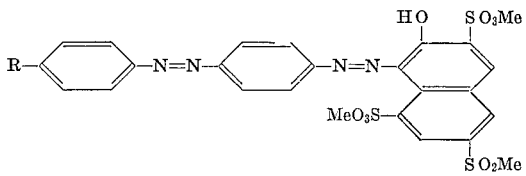

wherein R is hydrogen or SO$_3$Me and Me is alkali metal.

3. A dye solution according to claim 2, wherein said dye has the formula:

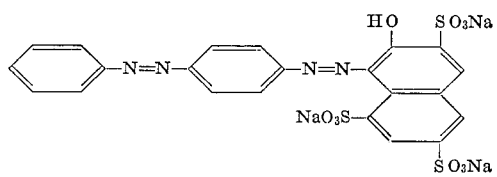

4. A dye solution according to claim 2, wherein said dye has the formula:

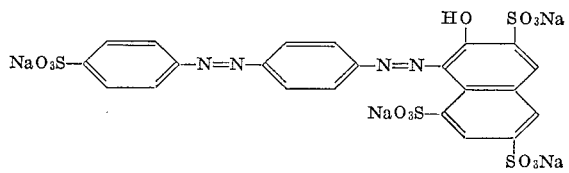

References Cited

UNITED STATES PATENTS 268,507 12/1882 Limpach _____ 260—190
3,120,423 2/1964 Herschler et al. _____ 8—55

GEORGE F. LESMES, Primary Examiner

B. BETTIS, Assistant Examiner

U.S. Cl. X.R.

8—8, 93